UNITED STATES PATENT OFFICE.

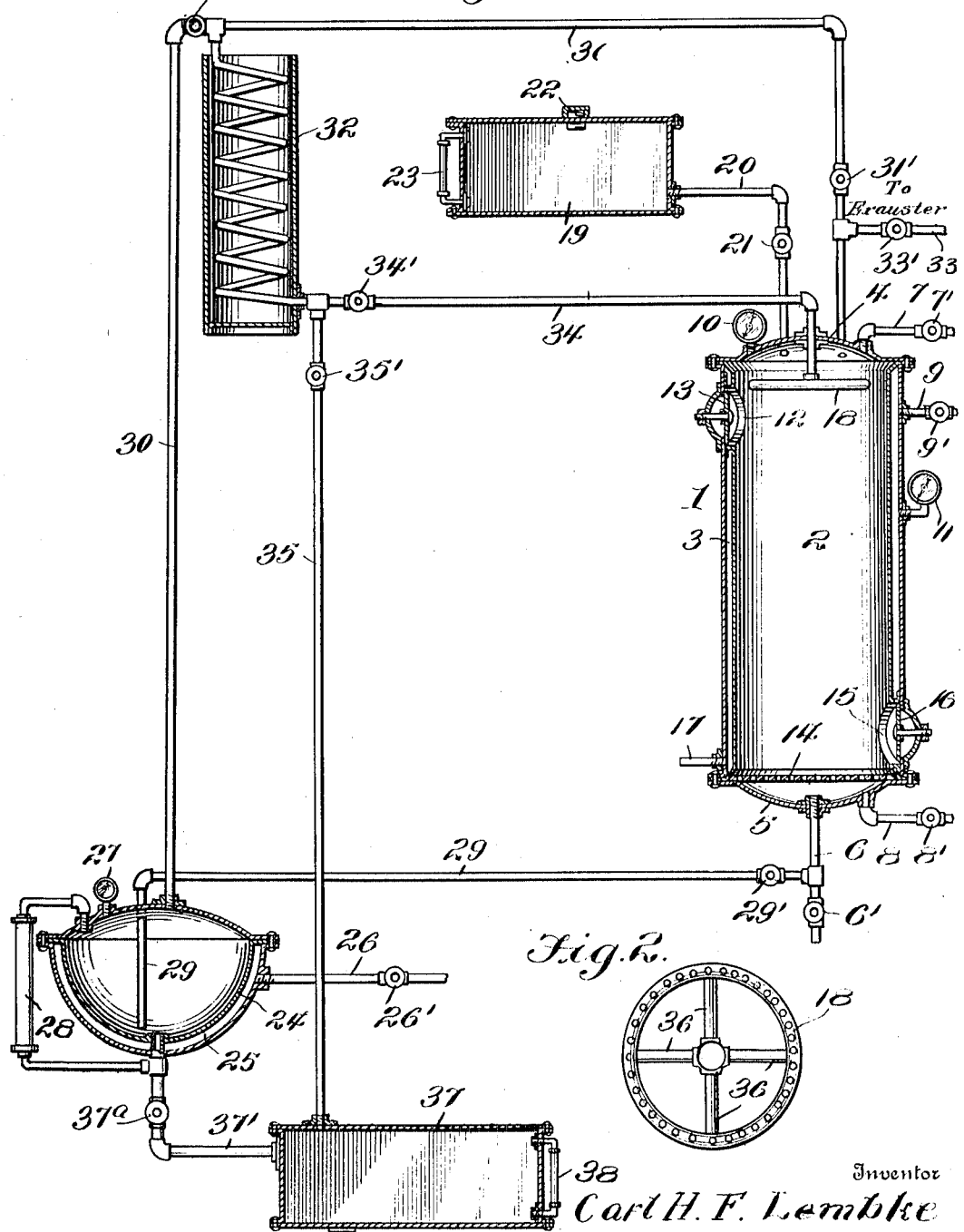

CARL H. F. LEMBKE, OF TOLEDO, OHIO.

EXTRACTING APPARATUS.

970,246.      Specification of Letters Patent.     Patented Sept. 13, 1910.

Application filed April 9, 1909. Serial No. 488,835.

*To all whom it may concern:*

Be it known that I, CARL H. F. LEMBKE, a citizen of the United States, residing at Toledo, in the county of Lucas and State of Ohio, have invented new and useful Improvements in Extracting Apparatus, of which the following is a specification.

This invention relates to an extracting apparatus, more especially designed for extracting turpentine and other essential oils from wood, but adapted also for extracting the essential substances from other materials, the object of the invention being to provide a simple and efficient type of apparatus using a solvent as the extracting agent and so constructed as to secure a rapid and economical extraction of the substance and recovery of the solvent for further use.

The invention consists of the features of construction, combination and arrangement of parts hereinafter fully described and claimed, reference being had to the accompanying drawings, in which:—

Figure 1 is a sectional elevation of the complete apparatus. Fig. 2 is a bottom plan view of a sprayer forming a part thereof.

Referring to the drawing, 1 designates an extracting vessel formed of inner and outer shells, providing an extracting chamber 2 and a heating jacket 3 surrounding said chamber and closed against communication therewith. The chamber 2 is closed at its upper end by a dome head 4 and has a bowl-shaped bottom or head 5, from which leads a discharge pipe 6, having a valve 6'. Pipes 7 and 8 communicate with the chamber 2 through the respective heads 4 and 5 and are provided with valves 7' and 8', while a similar pipe 9 communicates with the jacket and is provided with a valve 9'. These pipes 7, 8 and 9 are designed to supply steam to the extracting chamber and jacket from a boiler or other source of steam supply, gages 10 and 11 being provided by which the steam pressure in either may be determined.

The material from which the essential oils or active substance is to be extracted is introduced, in a suitable comminuted condition, into the chamber 2 through a manhole 12 having a closure plate 13 and is supported in the bottom of said chamber upon a perforated filter plate 14 arranged above the bottom 4. A manhole 15 is also provided for the removal of the waste substance after extraction and is provided with a cover 16. Leading from the base of the water jacket is a drip pipe 17 for the discharge of the water of condensation of the steam therein. At the top of the chamber 2 is a rose or annular sprayer 18, for a purpose hereinafter described.

A tank or reservoir 19, to contain a suitable solvent, is arranged above the vessel 1 and communicates with the top of chamber 2 through a pipe 20 having a valve 21 therein. This tank is provided with a suitable filling inlet 22 and a gage 23 for ascertaining the quantity of solvent therein. A retort or vaporizer 24 is arranged on a lower level than the vessel 1 and surrounded by a steam jacket 25, with which connects a steam supply pipe 26 provided with a valve 26'. This retort 24 is provided with a pressure gage 27 and a glass gage 28, and leading upward from its bottom and to the exterior through its top is a liquid conducting pipe 29, which extends to and connects with the pipe 6 above the valve 6' and is provided adjacent said pipe 6 with a valve 29'. From the top of the vaporizer also leads a vapor delivery pipe 30 connecting at its upper end with a pipe 31 leading to the top of the chamber 2 of vessel 1 and also connecting with the upper end of the coil of a condenser 32 arranged above said vessel 1. The pipe 30 is provided with a valve 30' and the pipe 31 with a valve 31' A steam exhaust pipe 33 connects with pipe 31 between the vessel 1 and valve 31' and is provided with a valve 33'. The pipe 33 is connected in practice with any suitable type of exhaust pump.

The lower end of the coil of the condenser is connected with pipes 34 and 35, which are respectively provided adjacent thereto with valves 34' and 35'. The pipe 34 leads into the top of the chamber 2, where it is connected with the rose or sprayer 18 at intervals around its circumference by a series of radial branches 36. The pipe 35 leads downward to a final tank or receptacle 37 having a glass gage 38 and a draw-off cock 39, which tank or receptacle is connected with the vaporizer by a pipe 37' provided with a valve 37ª. The condenser may be cooled in any of the ordinary ways.

Having thus described the construction of the apparatus, the operation thereof is as follows: The wood or other material having been introduced into the extracting chamber 2, through the manhole 12, and the latter sealed, by applying the plate 13, the valves

21, 29', 30', and 34' are opened and valves 6', 7', 8', 9', 31', 33', 35', 26' and 37ᵃ closed. The solvent contained in reservoir 19 then flows through pipe 20 into the extracting chamber 2, percolates through the mass of material therein, and passes with the amount of turpentine taken up thereby through the filter plate 14 and pipe 29 to the vaporizer 24. After all the solvent, or the amount required, has discharged from the tank 19 the valve 21 is closed. When the vaporizer is two-thirds filled with the filtrate, which may be determined by the glass 28, the valves 31' and 33' are closed and valve 26' is opened to admit steam through the pipe 26 to the jacket 25, whereby the vaporizer will be heated to a sufficient temperature to convert its contents into vapor. The vapor passes from the vaporizer through the pipe 30 to the condenser 32, wherein it is liquefied, and in this form the filtrate flows through the pipe 34 to the rose or sprayer 18, by which it is sprayed on the material in the chamber 2, percolates downward therethrough and extracts a further amount of turpentine and discharges from the extractor into the vaporizer, in which it is again vaporized. The vapor is then again conducted to the condenser and the liquefied and further enriched filtrate fed to the extractor for a repetition of the above-described operation. Steam is now allowed to enter the jacket through pipe 9 by opening valve 9' in sufficient amount to keep the contents at 50° F. By opening the valve 6' to discharge a small quantity of the liquid its temperature may be determined at desired intervals. This step of heating the contents to 50 degrees F. is continued until all of the turpentine, essential oils or alkaloid is extracted from the material, which may be determined by testing a quantity of the product obtained by opening valve 6'. At this stage valve 26' is closed to cut off the supply of steam to the vaporizer and the liquid solvent and extract allowed to pass into the vaporizer. The valves 29', 30' and 34' are then closed and valves 8', 9', 31' and 35' opened, thus cutting off communication between the extractor and vaporizer and the latter and condenser, and opening communication between the extractor and recovery tank 37 via the condenser, and at the same time admitting steam to the extracting chamber 2 and jacket 3. The extractor is thus heated until all the remainder of the solvent and extract are vaporized, the vapor passing through the pipe 31 to the condenser in which it is liquefied, the resultant solvent and extract passing down into the receptacle 37. Valves 8', 9', 31' and 35' are then closed and valves 7', 29' and 37ᵃ opened, the live steam entering through pipe 7, forcing all the water of condensation of the steam previously admitted into the chamber 2 into the vaporizer, and the entire contents of the latter through pipe 37' into the recovery tank 37. When this is accomplished valves 7' and 29' are closed and valve 33' opened, and all of the live and exhaust steam remaining in the chamber 2 sucked out by a suitable pump or exhauster. When the extractor is sufficiently cool, the waste material is drawn out through the manhole 15, the latter closed and the contents of the receptacle 37 discharged for the separation of the turpentine or other product and solvent, which latter is restored to the tank 19. The extractor may then be refilled for the succeeding operation.

From the foregoing it will be seen that my invention provides a simple type of apparatus by which the operation of extraction may be quickly, conveniently and economically performed and the solvent recovered for repeated use.

Having thus fully described the invention, what is claimed as new, is:—

1. In an extracting apparatus, the combination of an extracting tank having an external steam jacket, valved steam supply pipes connected with the tank and jacket, a valved filtrate discharge pipe leading from the bottom of the tank, a solvent reservoir arranged above the level of the tank and having a valved supply pipe communicating therewith, a vaporizer provided with a heating jacket, a valved steam supply pipe communicating therewith, a conducting pipe leading from said filtrate discharge pipe to the vaporizer and provided with a controlling valve therein, a collecting vessel disposed below the level of the tank and vaporizer, a valved pipe connecting said receptacle with the vaporizer, a condenser arranged above the level of the tank, vaporizer and collecting vessel, a conducting pipe leading from the vaporizer to the upper end of the condenser coil and having a controlling valve therein, pipes leading respectively from the lower end of the condenser coil to the tank and collecting vessel and provided with valves therein, a conducting pipe connected with the upper end of the condenser coil and leading therefrom to the tank and having a controlling valve, and a sprayer within the tank and communicating with the pipe leading thereto from the lower end of the coil.

2. In an extracting apparatus, the combination of an extracting tank having an external steam jacket, valved steam supply pipes connected with the tank and jacket, a valved filtrate discharge pipe leading from the bottom of the tank, a solvent reservoir arranged above the level of the tank and having a valved supply pipe communicating therewith, a vaporizer provided with a heating jacket, a valved steam supply pipe communicating therewith, a conducting pipe leading from said filtrate discharge pipe to the vaporizer and provided with a controlling valve therein, a collecting vessel disposed below the level of the tank and vaporizer, a valved pipe connecting said receptacle with the vaporizer, a condenser arranged above the level of the tank, vaporizer and collecting vessel, a conducting pipe leading from the vaporizer to the upper end of the condenser coil and having a controlling valve therein, a conducting pipe connected with the upper end of the condenser coil and leading therefrom to the tank and having a controlling valve, an exhaust pipe connected with said conducting pipe at a point between said valve and the tank and also provided with a controlling valve, and a sprayer within the tank and communicating with the pipe leading thereto from the lower end of the coil.

In testimony whereof I affix my signature in presence of two witnesses.

CARL H. F. LEMBKE.

Witnesses:
BERNHARD BECKER,
ERICH H. LEMBKE.